Figure 2:
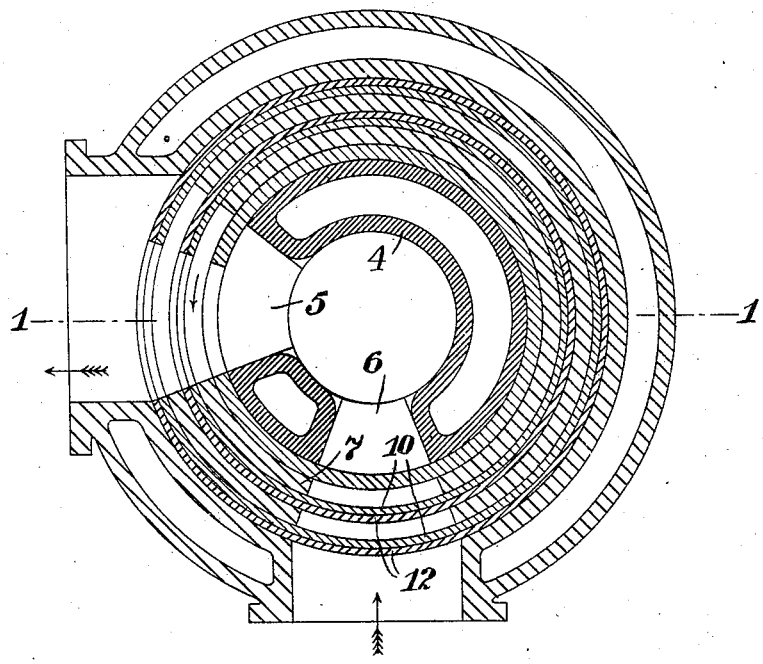

W. H. CLEGG.
ROTARY VALVE FOR INTERNAL COMBUSTION ENGINES.
APPLICATION FILED AUG. 13, 1910.
980,761.
Patented Jan. 3, 1911.
2 SHEETS—SHEET 1.
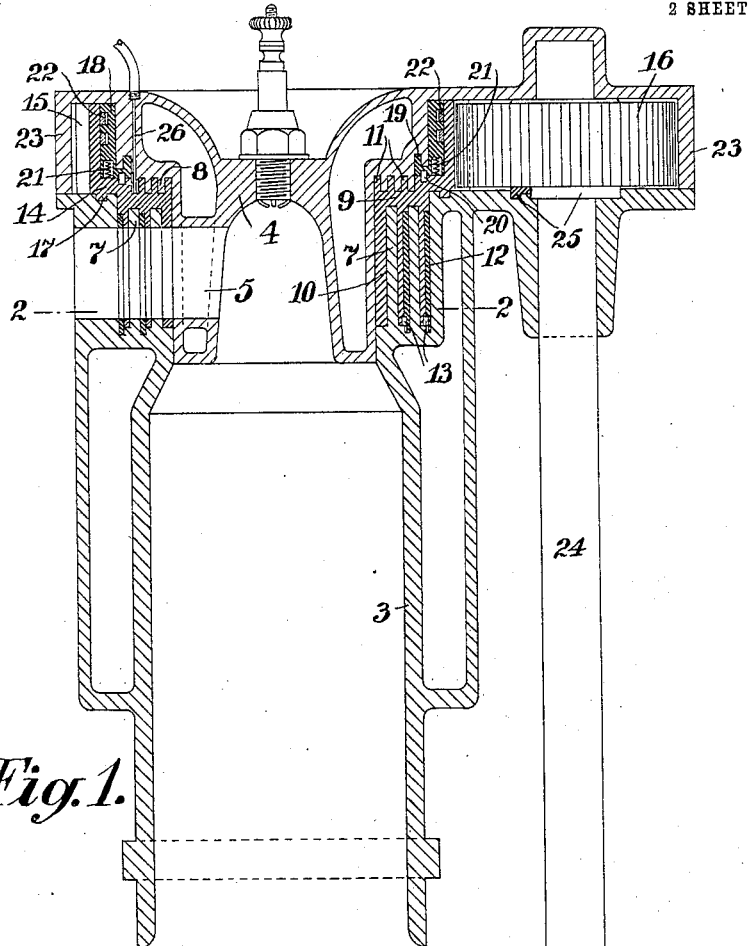
Fig. 1.
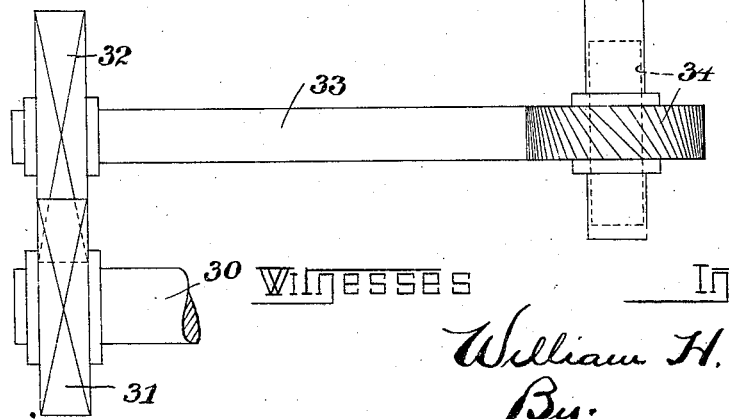
Witnesses
James R. Mansfield
L. E. Witham
Inventor
William H. Clegg
By Alexander & Dowell
Attorneys W. H. CLEGG.
ROTARY VALVE FOR INTERNAL COMBUSTION ENGINES.
APPLICATION FILED AUG. 13, 1910.

980,761.

Patented Jan. 3, 1911.
2 SHEETS—SHEET 2.

UNITED STATES PATENT OFFICE.

WILLIAM HENRY CLEGG, OF NEWTOWN, BURNLEY, ENGLAND, ASSIGNOR TO THE CLEGG ENGINE SYNDICATE LIMITED, OF BURNLEY, ENGLAND.

ROTARY VALVE FOR INTERNAL-COMBUSTION ENGINES.

980,761.  Specification of Letters Patent.  Patented Jan. 3, 1911.

Application filed August 13, 1910. Serial No. 577,036.

*To all whom it may concern:*

Be it known that I, WILLIAM HENRY CLEGG, a subject of the King of Great Britain, residing in Newtown, Burnley, in the county of Lancaster, in the Kingdom of England, have invented certain new and useful Improvements in Rotary Valves for Internal-Combustion Engines, of which the following is a specification.
This invention relates to improved means for controlling the inlet and exhaust of internal combustion engines of the kind in which a rotary valve member provided with a port or ports is arranged in the wall of the cylinder of the engine adjacent the head thereof so as to coact with ports in the wall to control the inlet and exhaust of the charge of gas. Valves of this kind as hitherto arranged have suffered from disadvantages due to the difficulty of securely packing the valve member, so as to prevent leakage from the cylinder past the valve during compression and explosion strokes, without causing great frictional resistance to the movements of the valve, due to the large contact surface of the packing and the heavy pressure which it is considered necessary to exert thereon. This difficulty was increased by the distortion of the valve ring which was liable to be produced by heat and other influences to which it is subjected when working.

In accordance with the present invention the above mentioned disadvantages are avoided by providing an improved form of valve member and of the parts in which it is mounted. In this improved form, grooves concentric with the cylinder are cut in each of the annular faces of the valve member and corresponding annular projections are formed on the adjacent stationary parts of the cylinder structure so that the grooves and rings intermesh when the valve member is in position. The rings on one end of the valve member and on the corresponding stationary intermeshing parts are preferably of such a height that the ports for the inlet and outlet of the gases may be cut radially through them at appropriate points.
The above described method of forming the valve has the advantage of providing a member which, being of considerable thickness, is naturally stiff, without being unduly heavy, and is adapted to resist distortion and in this it is assisted by the action of the parts in which it is mounted which serve as guides, supporting the ring over a large area. At the same time the improved construction provides secure packing against leakage from the cylinder past the valve while frictional resistance to the movement of the valve is minimized by the almost entire absence of unbalanced pressure between the surfaces of the valve and the parts in which it is mounted, this being assisted by the presence of a film of oil provided by the lubricating system between the working surfaces. The presence of this film of oil also assists the prevention of leakage of gas past the valve.

In addition to the features of the improved valve above mentioned others are present and will be brought forward in the following description of an embodiment of the invention which will now be given with reference to the accompanying drawings. These drawings illustrate the application of the invention to a single cylinder four stroke cycle engine. It will however be understood that the invention is also applicable to engines of other types, for instance, to two or six stroke cycle engines.

In these drawings:—Figure 1 is a vertical central section through the cylinder of the engine taken on the line 1—1 of Fig. 2, and Fig. 2 is a horizontal section taken on the line 2—2 of Fig. 1.

The cylinder structure shown in the drawings is of the kind in which the cylinder body is provided with a detachable head which is pierced to provide inlet and exhaust apertures, the head and body being so formed and arranged that a space is provided between them for the insertion of the valve member which is adapted to be rotated in this space by suitable gearing.

The cylinder body is indicated by the numeral 3 and the detachable head by 4. Through the latter extend passages 5 and 6 serving for the exhaust and inlet of the gases respectively.

In the end of the cylinder wall are cut a number of deep grooves concentric with the bore of the cylinder leaving a number of rings 7. In the construction illustrated, two of these rings are shown. On the adjacent part of the head 4 a series of grooves and rings is also formed, but in this case the rings 8 are of much smaller dimensions axially than the rings 7. In the space between the head 4 and the end of the cylinder body 3 the valve ring 9 is arranged, this ring being provided with annular projections 10 and 11 which fit between the rings 7 and 8. Some of the rings 10 are cut away at one side and are provided with separate rings 12 which fit into the recesses in the rings 10 and are connected with these rings by pins 13 or the like so that they rotate therewith. These rings 12 are not spring rings nor are they split. Their outer faces are machined so as to be an accurate fit in the recesses in which they work, while at the inside they have an easy fit on the rings 10 so that they may move slightly relative thereto. This slight freedom of the rings 12 relative to the rings 10, permits the former to remain true on their seating although the latter may be moved away to a slight extent by the effect of the driving gear or by other means. The use of the separate rings 12 also has an advantage in manufacture since it is a simpler matter to obtain an accurate surface on the separate parts than on the rings 10 forming part of the valve member 9. These rings 12 may, however, in some cases be dispensed with. The rings 7 are cut through at two points corresponding with the passages 5 and 6 in the head 4. The rings 10 and 12 are also pierced at one point so as to provide a port which is adapted to register with the ports in the rings 7 as the valve member 9 rotates. This action will be rendered clear by an examination of Fig. 2 in which the direction of rotation of the valve member is indicated by an arrow. In that figure the exhaust port is shown fully open, the valve member being approximately in the position which it would occupy at the middle of the exhaust stroke.

At its upper end the valve member 9 is provided with a laterally extending portion 14 with which is connected a ring of teeth 15. With these teeth engages a pinion 16 on the shaft 24, which is rotated from the crank shaft 30 by means of pinions 31 and 32, shaft 33 and screw gear 34, so as to produce rotation of the valve at an appropriate speed.

The laterally extending portion 14 of the valve member may be provided on its lower surface with a projecting ring 17 fitting in a groove in the part of the cylinder structure which forms the valve casing. On the other side, the part 14 carries a ring 18 of L-section which may be provided with a projecting ring 19 fitting in a groove in the cylinder head. This ring 18 is pressed by springs axially away from the valve member 10 but is connected therewith by means of pins 20 so that there is no relative rotary motion between the two. The pressure in the axial direction is provided by a number of springs 21. The use of the springs 21 insures a gas tight joint between the ring 18 and the adjacent wall of the cylinder head. In order to prevent leakage between the ring 18 and the rear surface of the ring of teeth 15, spring rings 22 are used, these being of the type usually employed on pistons. In the present case, however, practically no relative motion takes place between the parts between which the rings 22 are arranged. If desired, other forms of packing may be used instead of or in conjunction with these rings. The cylinder head 4 is provided with a rim 23 which abuts against the end of the lower part of the cylinder structure and serves as a distance piece to correctly position the head relative to the cylinder body and maintain the correct space for the valve member.

The casing for the pinion 16 is preferably formed by parts of the castings of the head and body of the cylinder so that a single chamber is produced in which are contained the valve member and its driving pinion. The only apertures in this chamber are at the ports so that as little opportunity as possible is provided for the escape of gas or of lubricating oil. In order to prevent leakage at the point where the shaft 24 of the pinion 16 enters the chamber, a ring 25 is preferably provided on the under side of the pinion so as to fit in a groove formed in the adjacent part of the casing surrounding the aperture at which the shaft 24 enters.

A source of oil supply is connected to a duct 26 in the valve casing so that a continuous supply of oil is fixed to the valve preferably under pressure. The oil during the working of the engine penetrates between the moving and stationary parts of the valve so that a film of oil lies between the surfaces of these parts and reduces friction and at the same time assists in preventing leakage of gas past the valve.

It will be understood that the above detailed description of one embodiment of the invention is given simply for purposes of illustration and not with a view to indicating that the invention is limited thereto. It will be recognized that modifications may be introduced into the construction without departing from the invention. For instance, the rings on the two ends of valve member and on the end of the cylinder wall may be differently proportioned as regards their axial dimensions from those shown. Also, if desired, arrangements of ports in the cylinder and in the ring different both as regards number and disposition from those illustrated and described may be employed.

I declare that what I claim is:—

1. A valve arrangement for internal combustion engines comprising a cylinder structure consisting of a cylindrical wall and a head fitting on one end thereof, ports in said structure, a ported annular valve member lying between said head and said wall and means for rotating said member, said member having on one of its annular faces concentric projecting rings, and the adjacent stationary part having a similar set of concentric projecting rings arranged so as to intermesh with the rings on said valve member, the rings of these two sets being pierced to provide ports which are adapted to come into and out of register as the valve member rotates.

2. A valve arrangement for internal combustion engines comprising a cylinder structure consisting of a wall and a head adapted to fit on one end of said wall, an annular valve member working between said head and said wall and means for rotating said valve member, said valve member having on each of its annular faces a set of concentric projecting rings, the parts of the wall and head between which the valve member lies being each provided with a set of projecting concentric rings intermeshing with the rings on the valve member, one of said sets of stationary rings being pierced to form ports and the corresponding set of rings on the valve member being also pierced to provide a port adapted to come into register with the stationary ports as the valve member is rotated.

3. In an internal combustion engine, a cylinder structure consisting of a wall and a head attached to one end of said wall, an annular valve member lying between said wall and said head, means for rotating said member, a set of projecting concentric rings on each end of said member, a similar set of rings on the cylinder wall and on the head arranged so as to intermesh with the rings on the valve member, ports formed in one of the stationary set of rings and a port formed in the rotating set of rings intermeshing therewith, faced rings mounted on some of the rings of the last mentioned set so as to have an easy fit thereon and to be rotated therewith.

4. A valve arrangement for internal combustion engines comprising a cylinder structure consisting of a cylindrical wall and a head fitting on one end thereof, ports in said structure, a ported annular valve member lying between said head and said wall and means for rotating said member, said member having on each of its annular faces concentric projecting rings and said wall and head having on their faces adjacent the valve member concentric projecting rings arranged so as to intermesh with the rings on said valve member, a second annular member mounted on said valve member so as to rotate therewith, means for pressing said second annular member against the adjacent stationary part of the cylinder structure, and packing means located between the valve member and said second annular member.

5. A valve arrangement for internal combustion engines comprising a cylinder structure consisting of a cylindrical wall and a head fitting on one end thereof, ports in said structure, a ported annular valve member lying between said head and said wall, said member having on each of its annular faces concentric projecting rings and said wall and head having on their faces adjacent the valve member concentric projecting rings arranged so as to intermesh with the rings on said valve member, a ring of teeth connected with the valve member, a pinion gearing with said ring of teeth and means for rotating said pinion, a second annular member mounted on the valve member within the ring of teeth, means for rotating said second annular member with the valve member, means for pressing said annular member into engagement with the adjacent stationary part of the cylinder structure and packing means located between said annular member and the rear face of the ring of teeth.

In witness whereof, I have hereunto signed my name this 5 day of August 1910, in the presence of two subscribing witnesses.

WILLIAM HENRY CLEGG.

Witnesses:
RICHARD L. CLEAVER,
RICHARD WILLIS WILLIAMS.